United States Patent [19]
Diller et al.

[11] Patent Number: 5,794,893
[45] Date of Patent: Aug. 18, 1998

[54] ELASTOMERIC TRANSITION FOR AIRCRAFT CONTROL SURFACE

[75] Inventors: Joseph B. Diller, Hurst, Tex.; Nicholas F. Miller, Jr., St. Charles, Mo.

[73] Assignee: Northrop Grumman Corporation, Los Angeles, Calif.

[21] Appl. No.: 487,953

[22] Filed: Jun. 7, 1995

[51] Int. Cl.⁶ .................................................... B64C 3/52
[52] U.S. Cl. ........................ 246/213; 244/215; 244/219; 244/130
[58] Field of Search .................... 246/213–215, 246/219, 75 R, 130

[56] References Cited

U.S. PATENT DOCUMENTS

| | | |
|---|---|---|
| 821,398 | 5/1906 | Wright et al. . |
| 1,341,758 | 6/1920 | Parker . |
| 1,365,346 | 1/1921 | Schenkel . |
| 2,152,029 | 3/1939 | Cone . |
| 2,329,133 | 9/1943 | Peed, Jr. . |
| 2,368,702 | 2/1945 | Bourne .............................. 244/130 |
| 2,973,170 | 2/1961 | Rodman . |
| 2,979,287 | 4/1961 | Ross . |
| 3,118,639 | 1/1964 | Kiceniuk . |
| 3,179,357 | 4/1965 | Lyon . |
| 3,902,944 | 9/1975 | Ashton et al. . |
| 3,937,778 | 2/1976 | Tanaka . |
| 3,962,506 | 6/1976 | Dunahoo . |
| 4,053,122 | 10/1977 | Gar . |
| 4,132,755 | 1/1979 | Johnson . |
| 4,169,749 | 10/1979 | Clark . |
| 4,429,844 | 2/1984 | Brown et al. ........................ 244/219 |
| 4,471,925 | 9/1984 | Kunz . |
| 4,565,595 | 1/1986 | Whitener . |
| 4,567,007 | 1/1986 | Harder . |
| 4,816,106 | 3/1989 | Turris et al. . |
| 4,865,275 | 9/1989 | Thompson . |
| 5,222,699 | 6/1993 | Albach et al. ........................ 244/213 |

FOREIGN PATENT DOCUMENTS 840739  5/1939  France .

*Primary Examiner*—Galen L. Barefoot
*Attorney, Agent, or Firm*—Terry J. Anderson; Karl J. Hoch, Jr.

[57] ABSTRACT

Elastomeric transition sections (118, 124) are mounted between the upper and lower portions of a wing (100) and a control surface (102) hinged thereto. The elastomeric transition sections include elastomeric material (126) having a plurality of holes (128) formed therethrough. Flexible rods (134, 136) are secured to either the wing or the control surface and extend through the holes (128) in the elastomeric material (126). The elastomeric transition sections provide a smooth aerodynamic transition between the wing and the control surface while permitting the control surface to pivot about the hinge axis (108) to perform the control function.

9 Claims, 4 Drawing Sheets

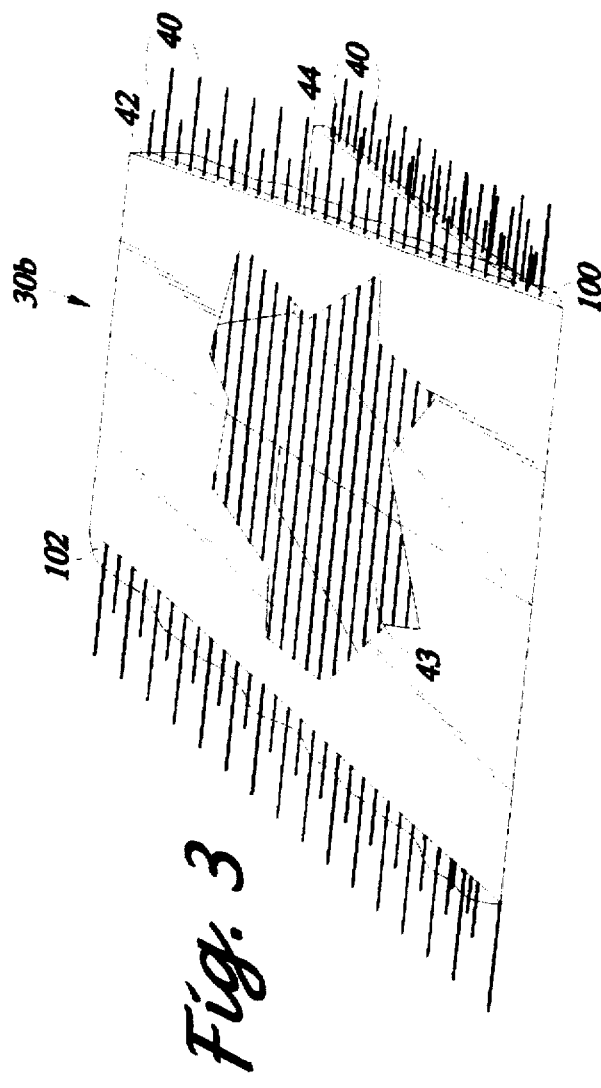
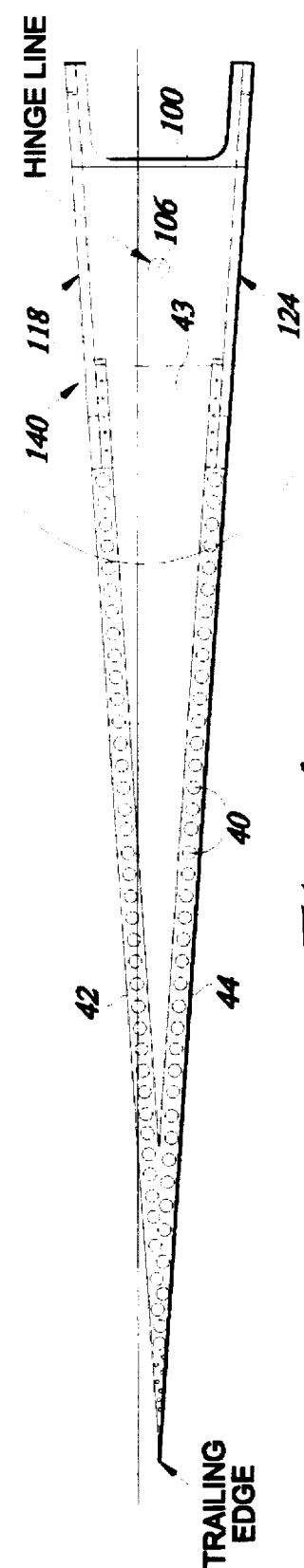

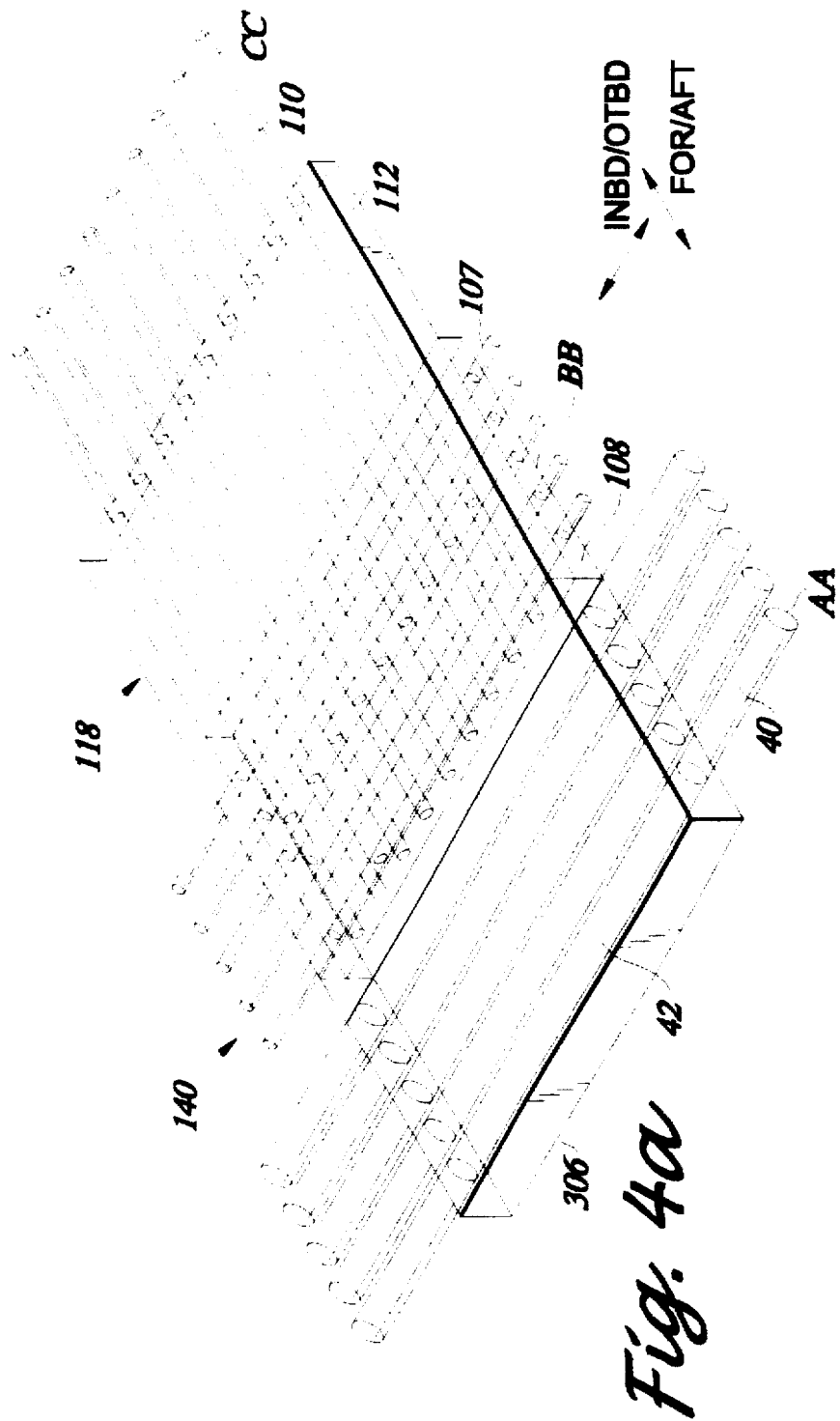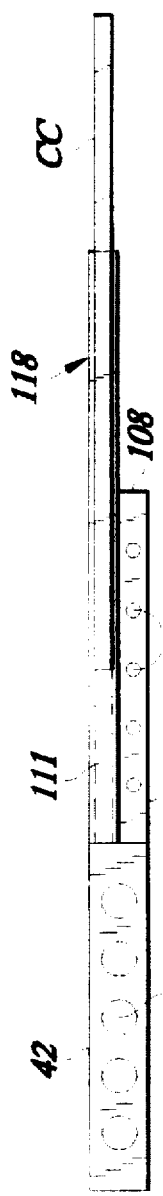

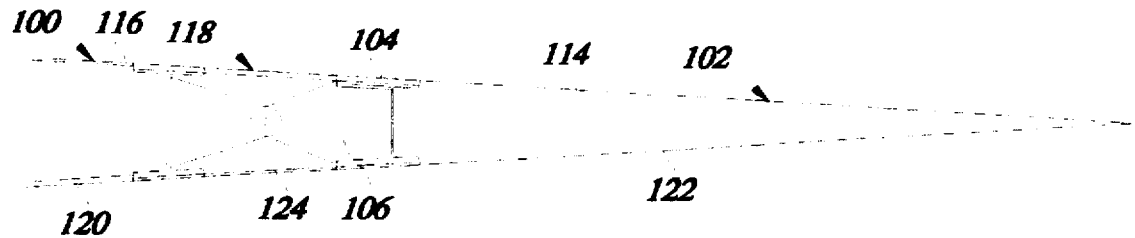
Fig. 5a
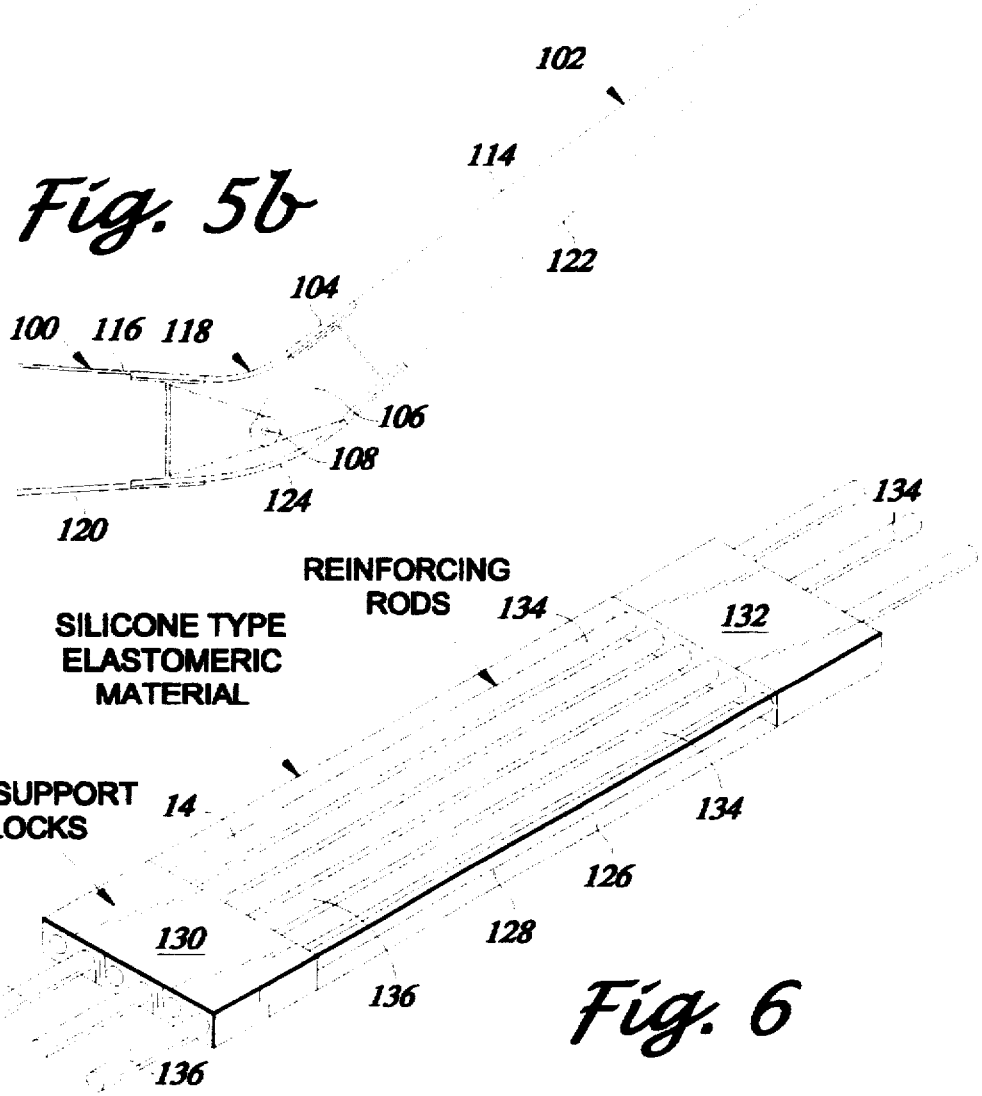
Fig. 5b
Fig. 6

ELASTOMERIC TRANSITION FOR AIRCRAFT CONTROL SURFACE

TECHNICAL FIELD OF THE INVENTION

This invention relates to an aircraft control surface. More specifically, this invention relates to an elastomeric transition between a wing member and a control surface at the hinge connection therebetween.

BACKGROUND OF THE INVENTION

The typical wing design for an aircraft includes a primary wing surface, having a leading edge and a trailing edge, with a control surface located on the leading and trailing edges of the wing. Flaps and ailerons are both examples of control surfaces, with flaps being designed to increase wing lift and ailerons used for roll axis control. The flaps on each wing operate in unison to increase wing lift by increasing the camber of the wing. By comparison, ailerons are pivoted oppositely to increase lift on one wing while reducing lift on the opposite wing to induce a rolling moment. Similarly, the elevator sections of the horizon tail are pivotably attached to the fixed tail section to vary lift and provide pitch control.

When either the flap or the aileron is activated, the control surface rotates relative to the trailing edge of the wing. Control surfaces are typically rigid structures which maintain their shape throughout rotation. Therefore, gaps or abrupt changes occur at the hinge area of a conventional control surface. This gap increases the drag and lowers the efficiency of the control surface. Additionally, as the control surfaces are rotated, gaps are formed between the ends of the hinged control surface and the adjacent portions of the fixed wing.

U.S. Pat. No. 5,222,699, issued on Jun. 29, 1993, to Albach, et al., and assigned to the assignee of the present invention discloses a variable control aircraft control surface. This patent discloses the use of an elastomeric transition section between inboard and outboard edges of a variable contour control surface and a main wing portion. The transition sections include thick elastomeric layers with oversized holes therein and rods positioned in the oversized holes. Some of the rods are attached to the main wing portion while others of the rods are attached to the control surface.

Several wing structures have been designed which provide for variable camber in an attempt to eliminate the need for separate and distinct control surfaces located at the trailing edge of the wing, which in turn would eliminate the abrupt changes or gaps between the separate control surfaces and the trailing edge of the wing. For example, U.S. Pat. No. 2,979,287 to Ross discloses an inflatable wing with variable camber. The design incorporates an inflatable fabric airfoil having upper and lower surfaces tied together by a plurality of tie threads. The flexible fabric forming the body of the wing is made so that the warp cords extend lengthwise or longitudinally of the wing, with the weft cords extending transversely of the wing. The weft cords are made more elastic or resilient than the warp cords so that by varying the inflation pressure inside the wing, the camber of the wing can be changed together with the effective lift-drag ratio.

U.S. Pat. No. 3,118,639 to Kiceniuk discloses a control and propulsion fluid foil. This design provides a foil construction which utilizes fluid pressure applied within cells contained in the foil construction in a manner to cause the foil to warp. This warping changes the amount of lift force acting on the foil, permitting it to function as a control surface. The application of the variable pressures to a series of cells can also produce an undulating motion. This undulation can function as a propulsion means if the foil were used underwater.

An example of a unique wing reinforcement structure is seen in U.S. Pat. No. 2,973,170 to Rodman which provides lightweight reinforcement on the inner surface of the wing and a smooth porcelainized outer wing surface. The reinforcement comprises a network of crossed wires or rods of relatively small diameter. Where the rods cross one another, the cross rods are flattened against the wing so that the reinforcement is in contact with the wing substantially up to the intersection of the wires or rods.

A need exists for an improved aircraft wing structure providing a control surface that allows for variable camber of the wing while eliminating any gap or abrupt change between the trailing edge of the wing and the joining edges of the control surface. Such a device should also provide an uninterrupted upper boundary wing surface and be durable enough to withstand the conditions encountered during flight.

SUMMARY OF THE INVENTION

In accordance with one aspect of the present invention, an aircraft wing assembly is provided which includes a main wing portion having a top skin and a bottom skin. A fixed contour control surface having a top skin and a bottom skin and a forward end and a trailing edge is attached at the forward end to the main wing portion for movement between the fixed contour control surface and the main wing portion. Upper and lower elastomeric layers join the top and bottom skins, respectively, of the fixed contour control surface to the corresponding top and bottom skins of the main wing portion at the forward end.

In accordance with another aspect of the present invention, the elastomeric layers are formed of elastomeric material having a plurality of holes formed therethrough and a plurality of rods. Each rod extends through one of the plurality of holes. Selected ones of the rods are secured to the main wing portion while others of said rods are connected to the variable control surface.

In accordance with another aspect of the present invention, the elastomeric layers further include a main wing portion attachment element and a fixed contour control surface attachment element, the plurality of rods attached to one or the other of said attachment elements, the main wing portion attachment element rigidly secured to the main wing portion and the fixed contour control surface attachment element rigidly secured to the fixed contour control surface. In accordance with another aspect of the present invention, the plurality of rods extend generally transverse the axis of motion of the fixed contour control surface relative to the main wing portion. In accordance with another aspect of the present invention, the rods are formed of a material selected from the group consisting of fiberglass, graphite, steel and aluminum. In accordance with another aspect of the present invention, the elastomeric material is silicon rubber.

BRIEF DESCRIPTION OF THE DRAWINGS

For a more complete understanding of the present invention, and for further details and advantages thereof, reference is now made to the following Detailed Description taken in conjunction with the accompanying drawings in which:

FIG. 3 is a perspective view of a transition section of an aircraft control surface of the present invention;

FIG. 4a is a perspective view of the corner intersection between the transition section and hinge-line encompassing both spanwise and chordwise support rods;

FIG. 4b is a side view of the corner;

FIG. 4c is a cross-section through the transition section;

FIGS. 5a and 5b are cross-sectional views of a second embodiment of the present invention illustrating an elastomeric transition section between the hinge connection of a main wing portion and a fixed contour control surface; and FIG. 6 is a perspective view of an elastomeric transition section constructed in accordance with the teachings of the present invention.

DETAILED DESCRIPTION

Figure 1A:
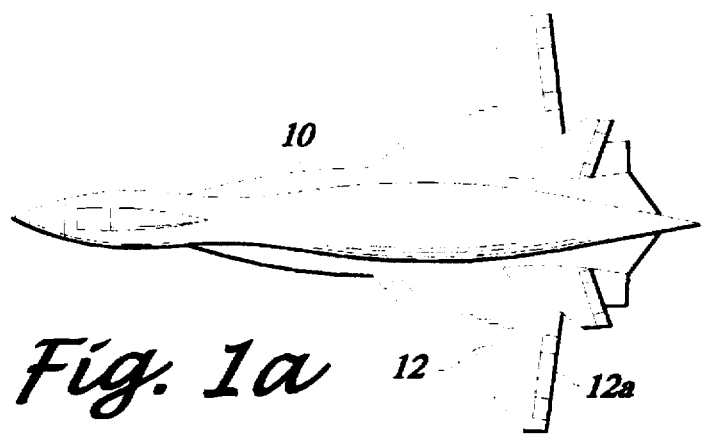
FIG. 1a is a plan form view of the aircraft control surface on the wing of an airplane.
Figure 1B:
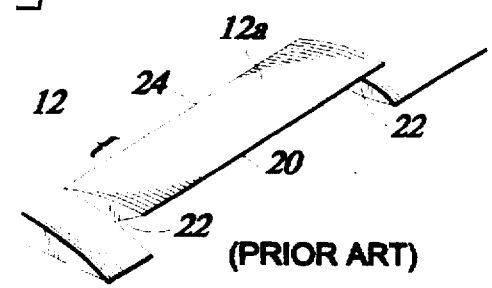
FIG. 1b is a perspective view of an example of an aircraft control surface in the form of a hinged control surface in accordance with the prior art.

The present invention is directed to an aircraft wing structural design having an integrated control surface that overcomes many of the disadvantages found in the prior art. Referring to FIG. 1a, an aircraft 10 is shown to illustrate the location of control surfaces on wing 12, including a control surface 12a on the trailing portion of wing 12. FIG. 1b is an enlargement of a portion of wing 12 wherein the control surface 12a is in the form of a prior art embodiment of a hinged control surface 20. The control surface 20 is hinged at hinge line 24 to wing 12. Gaps 22 exist between the outboard and inboard ends of control surface 20 and the stationary wing 12 as the control surface 20 is moved. Further, a discontinuity exists at hinge line 24.

Figure 1C:
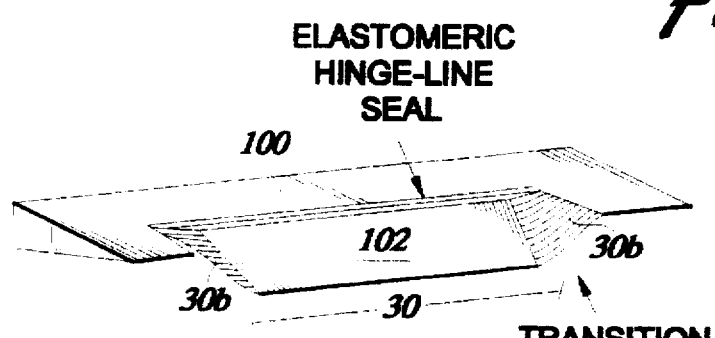
FIG. 1c is a perspective view of an aircraft control surface in the form of a rigid control surface with transition sections in accordance with the present invention.
Figure 2:
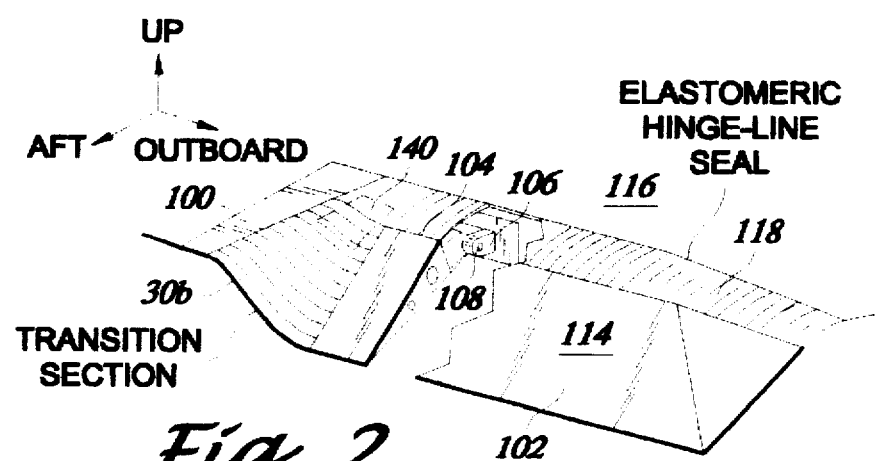
FIG. 2 is a perspective view of an aircraft control surface in the form of a rigid control surface with only one transition section and hinge-line seal extending to the outboard end of the wing.

Referring to FIG. 1c, which is an enlargement of a portion of a wing 100 wherein the aircraft control surface 12a is in the form of a rigid control surface 30 with transition sections in accordance with an embodiment of the present invention, the control surface 30 incorporates a rigid control surface 102 and a transition section 30b between each end of the control surface 102 and the laterally adjacent portion of wing 100. The control surface 102 can be moved relative wing 100 by an actuator mounted between the wing 100 and control surface 102. The actuator used can be either electrical or hydraulic, linear or rotary with appropriate attachment to the control surface 102 to allow movement in rotation about the hinge-line.

FIG. 3 provides a sectional view of the transition section 30b. The transition sections are located between the outboard and inboard ends of the rigid contour control surface 102 and the fixed wing 100. Air loads on the transition section 30b are supported by transfer structural rods 40 which are provided spanwise. The rods are positioned in oversized holes in upper and lower thick elastomeric layers or skins 42 and 44, thereby creating a semi-rigid structure. A flexible rib structure 43 ties upper and lower skins 42 and 44 together so they are in unison and airloads on both surfaces are shared.

Spanwise structural rods 40 are socketed (i.e., rigidly attached) at their ends either to the rigid control surface 102 or the fixed wing 100. These spanwise structural rods 40 extend over the width of the transition section and are designed to slide in the oversized holes in the transition section 30b as its length increases to form the complex "S" shape. Thus, the spanwise structural rods 40 attached to the end of the contour control surface 102 adjacent the fixed wing 100 overlap the rods 40 attached to the contour control surface 102 in parallel relationship.

Thus, it can be seen that the present invention provides an aircraft control surface designed to eliminate the discontinuities that occur at the ends of the surface. The structure achieves a more efficient airflow, and thus provides lower drag, by avoiding the abrupt changes in the air flow direction which normally occurs with hinged control surfaces. By avoiding abrupt changes which can result in early separation of the air flow, and earlier onset of transonic flow over the surface with the hinged control surface, the present structure provides substantial aerodynamic improvements. The structure is suitable for all hinged aerodynamic control surfaces and the transition section is suitable for all moving control surfaces.

The structure is achieved by use of a rigid airfoil shape with hinge-line transition sections to eliminate the gaps and abrupt changes that occur at the hinge area of a conventional control surface, and an elastomeric transition sections at the ends to provide a smooth transition between the deflected and the undeflected shape of the fixed wing or tail surface section. The elastomeric transition section is designed to assume a complex "S" shape required to provide a smooth transition between the deflected control surface and the adjacent fixed wing. The elastomeric transition section may also be used individually to provide a continuous surface between the fuselage and any moving mixed contour control surface.

With reference now to FIGS. 1c, 2, 4a, 4b, 5 and 6, a second embodiment of the present invention is illustrated. FIGS. 5a and 5b illustrate a portion of a wing 100 and a control surface 102 hinged at its forward end 104 by hinge 106 to the wing 100. The control surface 102 pivots about axis 108 of the hinge 106 under the action of hydraulic actuators of the type commonly used in aircraft construction. The actuators can also be screw actuators, electric actuators or rotary actuators.

Secured between the top surface 116 of the wing 100 and the top surface 114 of the control surface 102 is an elastomeric transition section 118. Similarly, between the bottom surface 120 of the wing 100 and bottom surface 122 of the control surface 102 is an elastomeric transition section 124.

FIG. 3 shows the control surface 102 can extend to the outboard end of the wing where the control surface tapers to a line. The transition sections 118 and 124 merge in a smooth transition as the control surface tapers to the outboard end to form a single thickness.

With reference to FIG. 6, the elastomeric transition sections 118 and 124 are seen to include an elastomeric material 126 having a plurality of elongate holes 128 formed therethrough. A wing attachment element 130 is attached at one end of the elastomeric material while a control surface attachment element 132 is attached at the other end of the elastomeric material 126. A plurality of wing mounted rods 134 are rigidly secured to the element 130 and extend within selected ones of the holes 128 toward and possibly through the control surface attachment element 132. Similar control surface rods 136 are rigidly secured to the control surface attachment element 132 and extend through others of the holes 128 toward and possibly through the wing attachment element 130. The attachment elements 130 and 132 each have bolt holes to bolt the elements rigidly to the wing 100 and control surface 102, respectively.

In a manner similar to that described above, the elastomeric transition sections 118 and 124 can expand and contract as the control surface 102 is activated relative to the wing 100 while maintaining a smooth aerodynamic transition between the wing and control surface. The elastomeric transition sections 118 and 124 can also be used in conjunction with the transition sections 30b previously described between the inboard and outboard edges of the control surface and the adjacent wing structure.

The rods can be formed of any suitable material, including fiberglass, graphite, steel and aluminum. Fiberglass rods can be formed as pultruded material of astroquartz epoxy or S2 glass epoxy fiber. It is desirable to have a high strength to modulus of elasticity ratio. The elastomeric material can be any suitable material, such as room temperature vulcanizing silicon rubber as sold by Dow Corning as, for example, Dow Corning 6121 elastomer.

With reference to FIGS. 4a and 4b, there is illustrated corner 140 which forms the transition between elastomeric transition section 118 and the layer 42 of transition section 30b at the ends of the control surface. As seen in FIG. 4c, the transition between section 124 and layer 44 is essentially identical. In section 30b, rods 40 extend spanwise in elastomeric layers 42 and 44. Near the hinge 106, reduced diameter spanwise rods 107 extend spanwise between the inboard and outboard ends of the control surface in elastomeric layer 108 which is integrally formed with elastomeric layer 112 having reduced diameter fore and aft rods 110 therein. The rods 110 are all secured at their forward ends to the wing 100. Alternate rods 40 and 107 are connected to the control surface 102 and the outboard or inboard edges of the wing 100. Rods 110 are allowed to slide fore and aft in oversized holes 111 in elastomeric layer 112. Corner 140 thus forms a smooth transition between the hinging action about the hinge 106 and the movement necessary between the inboard and outboard edges of the control surface and the facing surfaces of the wing.

Although preferred embodiments within the invention have been described in the foregoing description and illustrated in the accompanying drawings, it will be understood that the invention is not limited to the embodiments disclosed, but is capable of numerous rearrangements, modifications, substitution of parts and elements without departing from the spirit of the invention. Accordingly, the present invention is intended to encompass such rearrangements, modifications and substitutions of parts and elements as followed in spirit and scope of the invention.

We claim:

1. An aircraft wing assembly, comprising:
a main wing portion having a top portion and a bottom portion;
a variable contour control surface having a top portion and a bottom portion, said variable contour control surface having a forward end and a trailing edge, said control surface attached at the forward end to the main wing portion for movement of the control surface relative the main wing portion, said top and bottom portions of said main wing portion tapering to an outboard edge and said top and bottom portions of said variable contour control surface tapering to an outboard edge; and
upper and lower elastomeric transition sections joining the top and bottom portions, respectively, of the control surface to the corresponding top and bottom portions of the main wing portion at the forward end, said upper and lower elastomeric transition sections tapering to an outboard edge which extends between the outboard edges of the main wing portion and the variable contour control surface.

2. The aircraft wing assembly of claim 1 further comprising a flexible rib structure positioned between said upper and lower elastomeric transition sections.

3. The aircraft wing assembly of claim 1, wherein the elastomeric transition sections include elastomeric material having a plurality of holes formed therethrough and a plurality of rods, each of said rods extending through one of said plurality of holes, selected ones of the rods connected to the main wing portion and the others of said rods connected to the control surface.

4. The aircraft wing assembly of claim 3 wherein said selected ones of said rods and said others of said rods overlap.

5. The aircraft wing assembly of claim 3 wherein said rods are made of astroquartz epoxy or S2 glass epoxy fiber.

6. The aircraft wing assembly of claim 3, wherein the elastomeric transition sections further include a main wing portion attachment element and a control surface attachment element, the main wing attachment element rigidly secured to the main wing portion and the control surface attachment element rigidly secured to the control surface.

7. The aircraft wing assembly of claim 3, wherein said plurality of rods extend generally transverse to the axis of motion of the control surface relative to the main wing portion.

8. The aircraft wing assembly of claim 3, wherein the rods are formed of a material selected from the group consisting of: fiberglass, graphite, steel and aluminum.

9. The aircraft wing assembly of claim 1, wherein said elastomeric transition sections include elastomeric material comprising silicone rubber.

* * * * *